(12) United States Patent
Berberich

(10) Patent No.: US 8,256,575 B2
(45) Date of Patent: Sep. 4, 2012

(54) METHODS AND SYSTEMS FOR SEALING ROTATING MACHINES

(75) Inventor: Nathan Robert Berberich, Rotterdam, NY (US)

(73) Assignee: General Electric Company, Schenectady, NY (US)

( * ) Notice: Subject to any disclaimer, the term of this patent is extended or adjusted under 35 U.S.C. 154(b) by 279 days.

(21) Appl. No.: 11/843,420

(22) Filed: Aug. 22, 2007

(65) Prior Publication Data

US 2009/0050410 A1     Feb. 26, 2009

(51) Int. Cl.
*F01D 25/18* (2006.01)

(52) U.S. Cl. .......... 184/6.11; 184/6; 184/6.22; 277/355; 277/387; 277/388; 277/410; 415/173.5; 415/174.5; 310/52; 310/54; 310/55; 310/90

(58) Field of Classification Search .......... 184/6.11; 277/353, 354, 355; 415/173.3
See application file for complete search history.

(56) References Cited

U.S. PATENT DOCUMENTS

| | | | |
|---|---|---|---|
| 2,846,245 A * | 8/1958 | Weaver | 277/412 |
| 2,878,048 A | 3/1959 | Peterson | |
| 3,623,573 A * | 11/1971 | Csanady et al. | 184/6 |
| 5,026,252 A * | 6/1991 | Hoffelner | 415/174.2 |
| 5,029,875 A | 7/1991 | Spain et al. | |
| 5,076,590 A | 12/1991 | Steinetz et al. | |
| 5,090,710 A | 2/1992 | Flower | |
| 5,174,582 A * | 12/1992 | Ferguson | 277/355 |
| 5,308,088 A | 5/1994 | Atkinson et al. | |
| 5,318,309 A * | 6/1994 | Tseng et al. | 277/347 |
| 5,335,920 A | 8/1994 | Tseng et al. | |
| 5,511,886 A | 4/1996 | Sink | |
| 5,568,931 A | 10/1996 | Tseng et al. | |
| 5,749,584 A * | 5/1998 | Skinner et al. | 415/173.5 |
| 5,941,685 A * | 8/1999 | Bagepalli et al. | 415/173.3 |
| 5,961,279 A * | 10/1999 | Ingistov | 415/170.1 |
| 5,971,400 A | 10/1999 | Turnquist et al. | |
| 6,012,723 A | 1/2000 | Beeck | |
| 6,131,910 A | 10/2000 | Bagepalli et al. | |
| 6,139,019 A | 10/2000 | Dinc et al. | |
| 6,168,377 B1 | 1/2001 | Wolfe et al. | |
| 6,231,047 B1 | 5/2001 | Cunningham et al. | |
| 6,378,873 B1 | 4/2002 | Mayer et al. | |
| 6,435,513 B2 | 8/2002 | Skinner et al. | |
| 6,457,719 B1 * | 10/2002 | Fellenstein et al. | 277/355 |
| 6,464,230 B1 * | 10/2002 | Tong et al. | 277/355 |
| 6,622,490 B2 | 9/2003 | Ingistov | |
| 6,685,190 B1 * | 2/2004 | Mayer et al. | 277/355 |
| 6,692,228 B2 | 2/2004 | Turnquist et al. | |
| 6,739,592 B2 * | 5/2004 | Kono | 277/355 |
| 6,803,688 B2 * | 10/2004 | Estrada et al. | 310/90 |

(Continued)

*Primary Examiner* — Robert A Siconolfi
*Assistant Examiner* — San Aung
(74) *Attorney, Agent, or Firm* — Armstrong Teasdale LLP

(57) ABSTRACT

Methods and systems for reducing a flow of ambient air into a bearing lubricating oil system are provided. The system includes a lubricating oil bearing cover that is stationary with respect to the bearing wherein the bearing is configured to support a portion of a rotatable machine shaft. The cover includes a first end cap extending radially inwardly towards the shaft such that a cavity surrounding the bearing is formed by the cover and the first end cap and a set of seal rings positioned substantially concentric with the shaft and forming a seal against lubricating oil flow. The seal rings include a plurality of wire bristles extending radially inwardly from the end cap wherein the wire bristles are configured to extend to a surface of the shaft when assembled and the bristles are configured to present a tortuous flow path to gas infiltrating the cavity.

15 Claims, 4 Drawing Sheets

U.S. PATENT DOCUMENTS

| | | |
|---|---|---|
| 6,887,038 B2 | 5/2005 | Cabe et al. |
| 7,056,088 B2 | 6/2006 | Rivas et al. |
| 7,059,827 B1 | 6/2006 | Ingistov |
| 2002/0074730 A1* | 6/2002 | Mayer et al. .................. 277/355 |
| 2003/0185675 A1 | 10/2003 | Turnquist et al. |
| 2004/0150165 A1* | 8/2004 | Grondahl ...................... 277/355 |
| 2005/0206249 A1* | 9/2005 | Hashiba et al. ................. 310/54 |

* cited by examiner

METHODS AND SYSTEMS FOR SEALING ROTATING MACHINES

BACKGROUND

This invention relates generally to the field of oil deflector seals for rotating shafts, and more particularly to an oil deflector system including a seal that reduces gas flow around a rotating shaft to prevent ingestion of moisture and contaminates into a bearing lube oil system.

At least some known large steam turbines experience dirt and moisture contamination of the bearing lubricating oil system. Such contamination, if not corrected, may negatively impact bearing performance as well as systems that interface with the lube oil system such as, but not limited to control systems. Fossil-fueled steam turbines are particularly subject to the problem since they frequently operate in an environment contaminated with coal dust and fly ash.

One path of entry of the contaminants into the lubricating oil system may be by being drawn in through the bearing oil seals along with the atmospheric air that is necessary for ventilation of the system oil tank and for oil seal cooling. The bearing oil seals, commonly referred to as oil deflectors, are labyrinth seal arrangements which prevent leakage of lubricating oil from the associated bearing. Contaminated air is drawn in through the seal by the lubricating oil system vacuum, entering through the clearances formed by the oil deflector rings (teeth) and the shaft. Such contaminant ingestion may clog the deflector teeth and in some cases, the dirt build-up has been carbonized by high temperatures resulting in shaft damage.

A known attempt to prevent such effects off contamination includes supplying a pressurized gaseous fluid to the seal labyrinth seals. For example, steam seal systems, compressors, and other rotating equipment have been fitted with seals adapted to receive (and sometimes extract) a pressurized gas. These devices usually contain multiple cavities located along the shaft and use relatively small passages provided in the seal housing, or cavities, to inject the fluid into the tooth area. Because of the high air injection velocities for these configurations, high pressure and correspondingly high flow horsepower are needed to seal around the shaft. However, the close clearances eventually open reducing the effectiveness of the seal and the additional equipment also requires periodic maintenance attention.

SUMMARY

In one embodiment, a system for reducing a flow of ambient air into a bearing lubricating oil system includes a lubricating oil bearing cover that is stationary with respect to the bearing wherein the bearing is configured to support a portion of a rotatable machine shaft. The cover includes a first end cap extending radially inwardly towards the shaft such that a cavity surrounding the bearing is formed by the cover and the first end cap and a set of seal rings positioned substantially concentric with the shaft and forming a seal against lubricating oil flow. The seal rings include a plurality of wire bristles extending radially inwardly from the end cap wherein the wire bristles are configured to extend to a surface of the shaft when assembled and the bristles are configured to present a tortuous flow path to gas infiltrating the cavity.

In another embodiment, a steam turbine includes a rotating shaft at least partially supported by an oil lubricated bearing, an oil deflector for preventing leakage of lubricating oil from the bearing wherein the oil deflector is configured to facilitate preventing a flow of atmospheric air to the bearing lubricating oil system, and an oil-deflector housing surrounding a portion of the shaft and the bearing. The steam turbine also includes an oil deflector ring coupled to the housing substantially concentric with the shaft to form an inner labyrinth seal against oil leakage wherein the oil deflector ring is positioned proximate to the bearing along a longitudinal axis of the shaft and a brush seal coupled to the housing substantially concentric with the shaft and extending to a surface of the shaft to form an outer seal against oil leakage and atmospheric air infiltration and wherein the brush seal is spaced apart from the oil deflector along the axis of the shaft.

In yet another embodiment, a method of sealing a rotatable machine shaft includes forming a cavity surrounding a portion of the machine to be sealed, maintaining a first pressure inside the cavity that is lower with respect to a second pressure outside the cavity, and positioning a seal including a plurality of wire segments between an edge of the cavity and the shaft to reduce a flow of atmospheric air infiltration along the shaft past the seal into the cavity wherein a free end of the wire segments contact a surface of the shaft.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, reducing a flow of ambient air into a bearing lubricating oil system. However, it is contemplated that this disclosure has general application to sealing spaces between cavities in rotating equipment in industrial, commercial, and residential applications.

Figure 1:
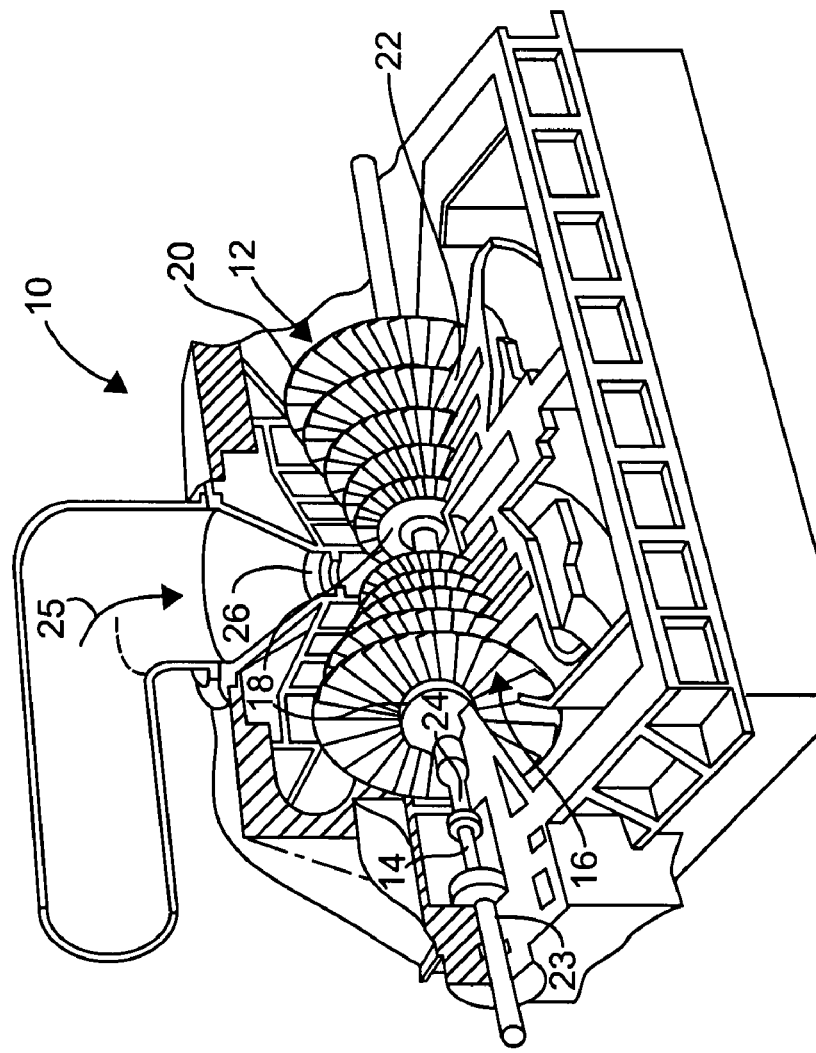
FIG. 1 is a perspective partial cut away view of an exemplary steam turbine in accordance with an embodiment of the present invention.

FIG. 1 is a perspective partial cut away view of an exemplary steam turbine 10 including a rotor 12 that includes a shaft 14 and a plurality of turbine stages 16. Turbine rotor 12 includes a plurality of axially spaced rotor wheels 18. A plurality of buckets 20 are mechanically coupled to each rotor wheel 18. More specifically, buckets 20 are arranged in rows that extend circumferentially around each rotor wheel 18. A plurality of stationary nozzles 22 extend circumferentially around shaft 14 and are axially positioned between adjacent rows of buckets 20. Nozzles 22 cooperate with buckets 20 to form each turbine stage 16 and to define a portion of a steam flow path through turbine 10. Shaft 14 is supported and guided in rotation by a plurality of bearings 23 and 24.

In operation, steam 25 enters an inlet 26 of turbine 10 and is channeled through nozzles 22. Nozzles 22 direct steam 25 downstream against buckets 20. Steam 25 passes through the remaining stages 16 imparting a force on buckets 20 which causes rotor 12 to rotate. At least one end of turbine 10 may extend axially away from rotor 12 and may be attached to a load or machinery (not shown), such as, but not limited to, a generator, and/or another turbine. Accordingly, a large steam turbine unit may actually include several turbines that are all co-axially coupled to the same shaft 14. Such a unit may, for example, include a high-pressure (HP) turbine coupled to an intermediate-pressure (IP) turbine, which is coupled to a low-pressure (LP) turbine. In one embodiment, steam turbine 10 is commercially available from General Electric Power Systems, Schenectady, N.Y.

Figure 2:
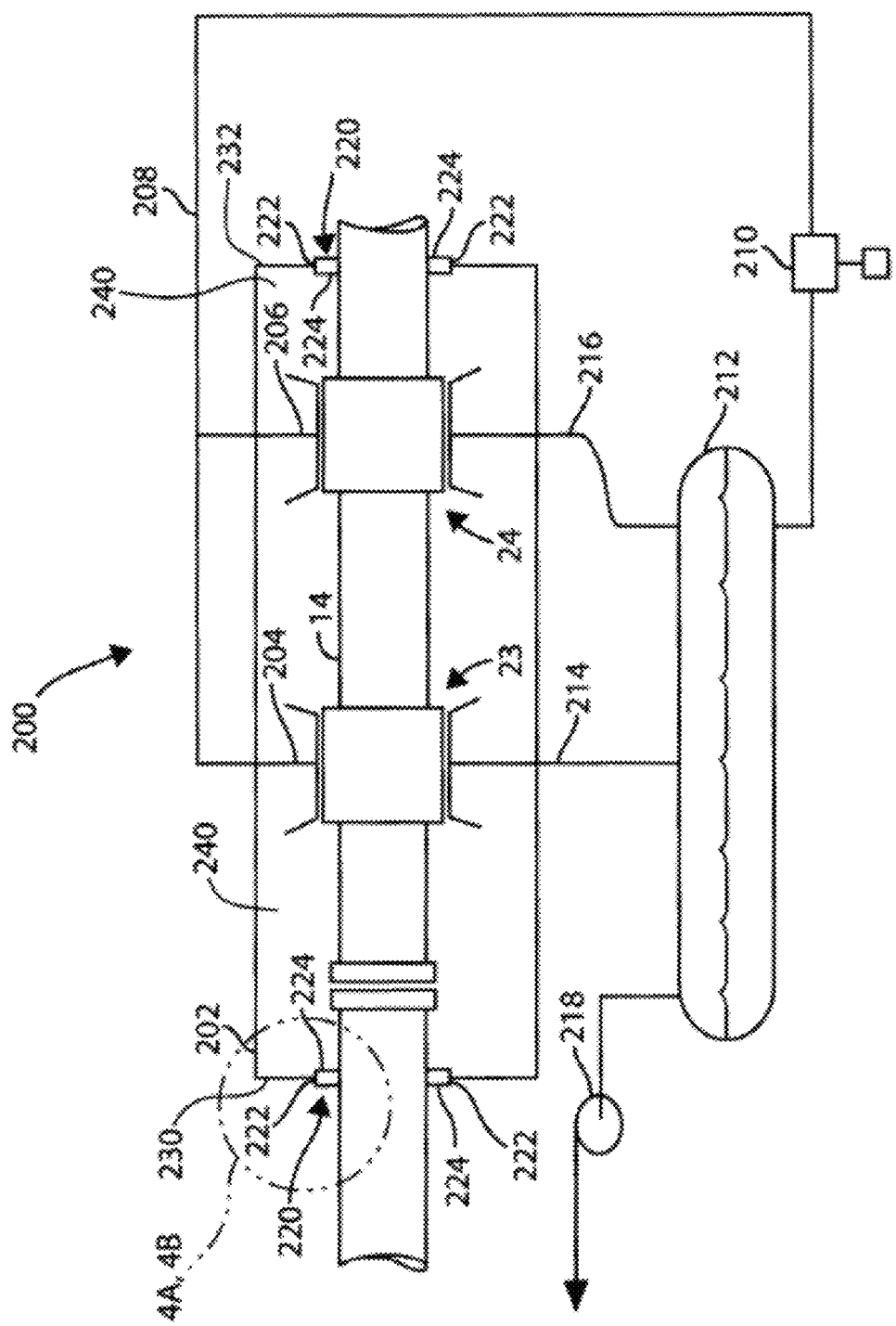
FIG. 2 is an enlarged portion of the turbine shown in FIG. 1 illustrating an oil lubricated bearing system in accordance with an embodiment of the present invention.

FIG. 2 is an enlarged portion of turbine 10 (shown in FIG. 1) illustrating an oil lubricated bearing system 200 in accordance with an embodiment of the present invention. The exemplary embodiment of the invention suitable for use in combination with a large steam turbine to prevent leakage of bearing lubricating oil and to prevent the in-flow of unfiltered atmospheric air to the bearing lubricating oil system. Shaft 14 carries the rotating components of a steam turbine and is supported in turn by journal bearings 23 and 24 located along its length. Shaft 14 is shown projecting from the end of turbine 10 with a bearing housing 202 substantially surrounding journal bearings 23 and 24. Journal bearings 23 and 24 are continuously fed with lubricating oil such that the portion of shaft 14 within a bearing housing 202 is continuously exposed to an oil laden environment. Lubricating oil is supplied to oil supply branches 204 and 206 through a supply header 208 from a lubricating oil pump 210. Pump 210 takes a suction from lubricating oil sump 212, which collects oil from bearings 23 and 24 by gravity through drain lines 214 and 216, respectively. A vapor extractor such as a centrifugal fan 218 removes gases from oil residing in sump 212 and through drain lines 214 and 216, maintains a negative pressure in bearing housing 202 with respect to atmospheric air pressure.

Figure 4A:
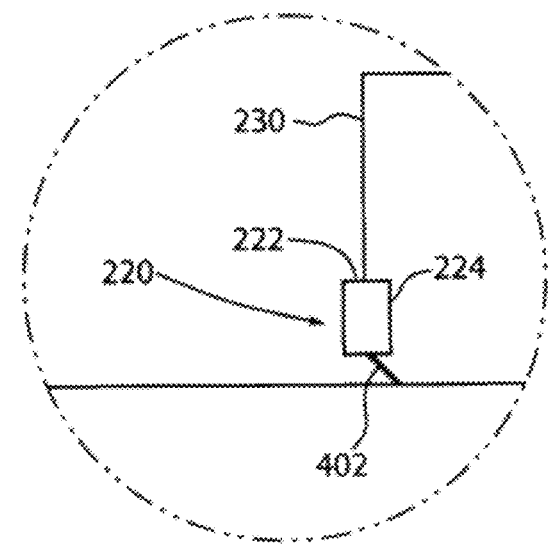
FIG. 4A is an enlarged view of an exemplary brush seal that may be used with the oil lubricated bearing system shown in FIG. 3.
Figure 4B:
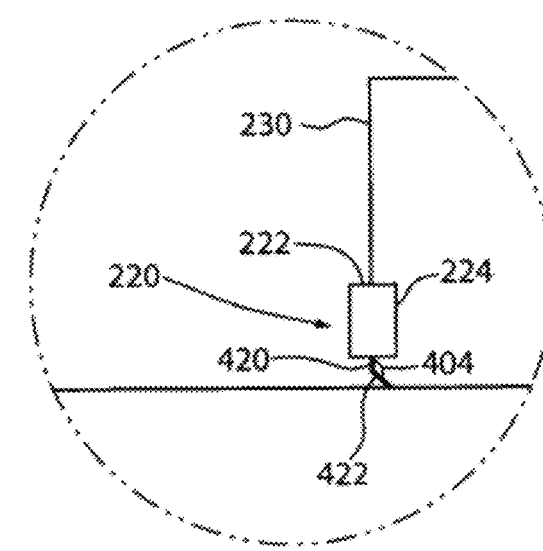
FIG. 4B is an enlarged view of another exemplary brush seal that may be used with the oil lubricated bearing system shown in FIG. 3.

The negative pressure within bearing housing 202 facilitates reducing oil leakage from bearing housing 202, however the negative pressure also drives a flow of air from the atmosphere surrounding bearing housing 202 into bearing housing 202 through a gap 220 between shaft 14 and bearing housing 202. In the exemplary embodiment, the bearing housing 202 includes a first 230 and second 232 end cap extending radially inwardly towards the shaft 14 such that a cavity 240 surrounding the bearing is formed by the bearing housing 202 and the first 230 and second 232 end cap. Gap 220 is formed between shaft 14 and an edge 222 of bearing housing circumscribing shaft 14. The infiltrating air is eventually removed from oil lubricated bearing system 200 through fan 200, however the infiltrating air also carries moisture and highly abrasive contaminants such as coal dust and/or flyash, which is not easily removed from oil lubricated bearing system 200. Oil deflectors comprising labyrinth paths have been used in an attempt to reduce the air flow through gap 220. However, such seals are non-contact and may become deformed during transients wherein gap 220 is closed due to for example, temperature induced differential expansion of shaft and bearing components. In the exemplary embodiment, a brush seal 224 is coupled circumferentially along edge 222 such that gap 220 is substantially blocked by brush seal 224. In an alternative embodiment, brush seals are installed in addition to existing deflector rings to form a tandem oil seal comprising at least one oil deflector ring and at least one brush seal in serial flow alignment. In an alternative embodiment, the brush seal 224 comprises a plurality of wire bristles 402 (shown in FIG. 4) angled with respect to associated radii of the shaft 15. In another alternative embodiment, the brush seal 224 comprises a plurality of wire bristles 404 (shown in FIG. 4) that each comprise a first substantially straight portion 420 and a second substantially straight portion 422, said first 420 and second 422 portions angled with respect to each other. The oil deflector rings and brush seals may be installed together on a single holder and coupled to housing 202 along edge 222. Alternatively, the brush seals may be retro-fitted to an existing housing 202 spaced axially apart from existing oil deflector rings.

Figure 3:
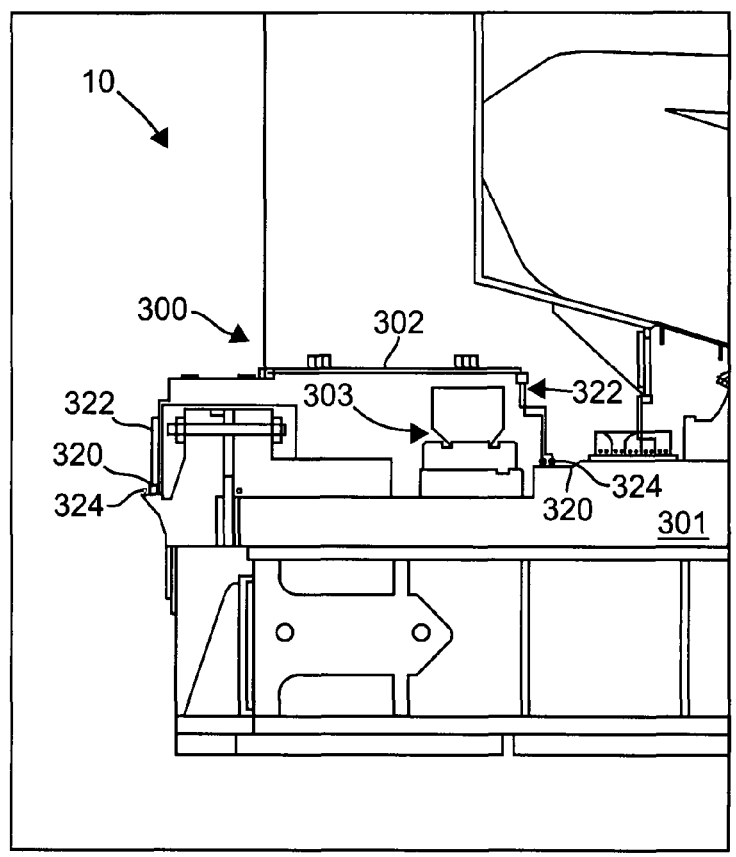
FIG. 3 is another enlarged portion of the turbine shown in FIG. 1 illustrating an oil lubricated bearing system in accordance with another embodiment of the present invention.

FIG. 3 is another enlarged portion of turbine 10 (shown in FIG. 1) illustrating an oil lubricated bearing system 300 in accordance with an embodiment of the present invention. The exemplary embodiment of the invention suitable for use in combination with a large steam turbine to prevent leakage of bearing lubricating oil and to prevent the in-flow of unfiltered atmospheric air to the bearing lubricating oil system. A shaft 301 carries the rotating components of a steam turbine and is supported in turn by a journal bearing 303 located along its length. Shaft 301 is shown projecting from the end of turbine 10 with a bearing housing 302 substantially surrounding journal bearing 303. Journal bearing 303 is continuously fed with lubricating oil such that the portion of shaft 301 within bearing housing 302 is continuously exposed to an oil laden environment. A vapor extractor (not shown in FIG. 3) removes gases from housing 302 through oil drain lines (not shown in FIG. 3) and maintains a negative pressure in bearing housing 302 with respect to atmospheric air pressure.

The negative pressure within bearing housing 302 facilitates reducing oil leakage from bearing housing 302, however the negative pressure also drives a flow of air from the atmosphere surrounding bearing housing 302 into bearing housing 302 through a gap 320 between shaft 301 and bearing housing 302. Oil deflectors 322 comprising labyrinth paths are positioned between housing 302 and shaft 301 to facilitate reducing a flow of oil leakage from inside housing 302 to the space outside of housing 302. In addition a brush seal 324 is coupled circumferentially along gap 320, which is substantially blocked by brush seal 224.

The above-described methods and systems that facilitate reducing a flow of ambient air into a bearing lubricating oil system are cost-effective and highly reliable. The methods and systems facilitate sealing internal cavities of rotating machines against air infiltration and contamination of lubricating oil systems while allowing the oil seal to maintain a high level of oil collecting and sealing performance. Accordingly, the above-described methods and systems facilitate the operation and maintenance of oil lubricated rotating machinery in a cost-effective and reliable manner.

While the invention has been described in terms of various specific embodiments, it will be recognized that the invention can be practiced with modification within the spirit and scope of the claims.

What is claimed is:

1. An oil seal system comprising:
a lubricating oil bearing cover that is stationary with respect to a bearing wherein the bearing is configured to support a portion of a rotatable machine shaft having a smooth circumferential contact surface, said cover comprising a first end cap extending radially inwardly towards the shaft such that a cavity surrounding the bearing is formed by said cover and said first end cap;
at least one oil deflector positioned between the shaft and said bearing cover; and a set of seal rings substantially concentric with the shaft and forming a seal against lubricating oil flow, said seal rings comprising a plurality of wire bristles extending radially inwardly from said end cap, said wire bristles configured to extend to and have continuous contact with the surface of the shaft when assembled, said bristles configured to present a tortuous flow path to gas infiltrating the cavity, said plurality of wire bristles each comprise a first substantially straight portion and a second substantially straight portion, said first and second portions positioned such that a longitudinal axis of each second substantially straight portion is obliquely oriented with respect to a radii of the shaft at the location where said second substantially straight portion contacts the shaft;

an oil reservoir coupled to said cover for receiving lubricating oil from the bearing; and, a vapor extractor coupled to said oil reservoir for extracting oil vapor from said oil seal system, said vapor extractor configured to create a negative pressure within said cavity to facilitate reducing oil leakage from said cavity.

2. An oil seal in accordance with claim 1 wherein said set of seal rings is configured to prevent leakage of lubricating oil from bearings of the shaft when the shaft is rotating.

3. An oil seal in accordance with claim 1 wherein said pressure internal to said cavity is less than a pressure outside of said cavity.

4. An oil seal in accordance with claim 3 further comprising at least one lubricating oil drain line coupled between the bearing and said oil reservoir for channeling lubricating oil from the bearing to said oil reservoir.

5. An oil seal in accordance with claim 4 wherein said vapor extractor is coupled in flow communication with said cavity through said lubricating oil drain line.

6. An oil seal in accordance with claim 1 wherein said cover comprises a second end cap extending radially inwardly towards the shaft such that said cavity surrounding the bearing is formed by said cover, said first end cap, and said second end cap.

7. An oil seal in accordance with claim 6 further comprising a set of oil seal rings associated with said second end cap, said set of oil seal rings are substantially concentric with the shaft and form a labyrinth seal against lubricating oil flow, said set of oil seal rings comprising a plurality of wire bristles extending radially inwardly from said second end cap, said wire bristles are configured to extend to a surface of the shaft when assembled, said bristles are configured to present a tortuous flow path to gas infiltrating the cavity.

8. A steam turbine comprising:
a rotating shaft having a smooth circumferential contact surface at least partially supported by an oil lubricated bearing;
an oil deflector for preventing leakage of lubricating oil from the bearing, said oil deflector configured to facilitate preventing a flow of atmospheric air to the bearing lubricating oil system;
an oil-deflector housing that defines a cavity surrounding a portion of the shaft and the bearing;
an oil deflector ring coupled to the housing substantially concentric with the shaft to form an inner labyrinth seal against oil leakage, said oil deflector ring being positioned proximate to the bearing along a longitudinal axis of the shaft;
a brush seal coupled to the housing substantially concentric with the shaft and extending to and in continuous contact with the surface of the shaft to form an outer seal against oil leakage and atmospheric air infiltration, said brush seal being spaced apart from the oil deflector along the axis of the shaft, wherein said brush seal comprises a plurality of wire bristles extending radially inwardly from said end cap, said plurality of wire bristles each comprise a first substantially straight portion and a second substantially straight portion, said first and second portions positioned such that a longitudinal axis of each second substantially straight portion is obliquely oriented with respect to a radii of the shaft at the location where said second substantially straight portion contacts the shaft;

an oil reservoir coupled to said housing for receiving lubricating oil from said bearing; and, a vapor extractor coupled to said oil reservoir for extracting oil vapor from said cavity and said oil reservoir, said vapor extractor configured to create a negative pressure within said cavity to facilitate reducing oil leakage from said cavity.

9. A turbine in accordance with claim 8 wherein the oil-deflector housing comprises a first end wall extending radially inwardly towards the shaft such that said cavity surrounding the bearing is formed by said housing and said first end wall.

10. A turbine in accordance with claim 8 wherein said wire bristles are configured to extend to the surface of the shaft when assembled, said bristles configured to present a tortuous flow path to gas infiltrating the cavity.

11. A turbine in accordance with claim 8 wherein the pressure internal to said cavity is less than a pressure outside of said cavity.

12. A turbine in accordance with claim 11 further comprising at least one lubricating oil drain line coupled to said bearing and said oil reservoir for channeling lubricating oil from said bearing to said oil reservoir.

13. A turbine in accordance with claim 12 wherein said vapor extractor is coupled in flow communication with said cavity through said lubricating oil drain line.

14. A method of sealing a rotatable machine shaft comprising:
forming a cavity surrounding an oil lubricated bearing of the machine;
maintaining a first pressure inside the cavity that is lower with respect to a second pressure outside the cavity to facilitate reducing oil leakage from the cavity;
positioning at least one oil deflector between the shaft and the bearing cover;
positioning a seal including a plurality of wire segments between an edge of the cavity and the shaft to reduce a flow of atmospheric air infiltration along the shaft past the seal into the cavity, said plurality of wire segments each comprise a first substantially straight portion and a second substantially straight portion, said first and second portions positioned such that a longitudinal axis of each second substantially straight portion is obliquely oriented with respect to a radii of the shaft at the location where a free end of each substantially straight second portion is in continuous contact with a surface of the shaft;
channeling a flow of lubricating oil from the bearing to an oil sump; and
discharging oil vapor from the oil reservoir to generate the first pressure within the cavity.

15. A method in accordance with claim 14 further comprising channeling oil vapor from the cavity into the oil reservoir through an oil drain line to maintain the first pressure lower than the second pressure.

* * * * *